(12) United States Patent
Kunter et al.

(10) Patent No.: US 10,988,370 B2
(45) Date of Patent: Apr. 27, 2021

(54) SIGNAL-CONTROLLED FLOW FUEL DELIVERY VALVE

(71) Applicant: Elaflex Hiby GmbH & Co. KG, Hamburg (DE)

(72) Inventors: Stefan Kunter, Hamburg (DE); Heinz-Ulrich Meyer, Hamburg (DE)

(73) Assignee: Elaflex Hiby GmbH & Co. KG, Hamburg (DE)

( * ) Notice: Subject to any disclaimer, the term of this patent is extended or adjusted under 35 U.S.C. 154(b) by 24 days.

(21) Appl. No.: 15/910,227

(22) Filed: Mar. 2, 2018

(65) Prior Publication Data
US 2018/0251367 A1    Sep. 6, 2018

(30) Foreign Application Priority Data
Mar. 3, 2017 (EP) .................................. 17159180

(51) Int. Cl.

| | |
|---|---|
| *B67D 7/36* | (2010.01) |
| *B60K 15/04* | (2006.01) |
| *B67D 7/02* | (2010.01) |
| *B67D 7/04* | (2010.01) |
| *B67D 7/52* | (2010.01) |
| *B60K 15/03* | (2006.01) |
| *F01N 3/20* | (2006.01) |
| *B67D 7/48* | (2010.01) |

(52) U.S. Cl.
CPC ................ *B67D 7/36* (2013.01); *B60K 15/04* (2013.01); *B67D 7/02* (2013.01); *B67D 7/0294* (2013.01); *B67D 7/04* (2013.01); *B67D 7/52* (2013.01); *B60K 2015/03203* (2013.01); *B60K 2015/03328* (2013.01); *B60K 2015/0477* (2013.01); *B67D 7/48* (2013.01); *F01N 3/2073* (2013.01); *F01N 2610/142* (2013.01); *F01N 2610/1413* (2013.01)

(58) Field of Classification Search
CPC ........... B60K 2015/03203; B60K 2015/03328; B60K 2015/0477; B60K 15/04
See application file for complete search history.

(56) References Cited

U.S. PATENT DOCUMENTS

| | | |
|---|---|---|
| 8,499,802 B2 | 8/2013 | Falckenberg et al. |
| 8,695,468 B2 | 4/2014 | Meyer |
| 8,800,611 B2 | 8/2014 | Tsiberidis |
| (Continued) | | |

FOREIGN PATENT DOCUMENTS

| | | |
|---|---|---|
| CN | 102173371 A | 9/2011 |
| DE | 102008049150 | 12/2009 |
| (Continued) | | |

*Primary Examiner* — Daphne M Barry
(74) *Attorney, Agent, or Firm* — Casimir Jones, S.C.; Brian F. Bradley

(57) ABSTRACT

The invention concerns a delivery valve for the delivery of a fluid into a tank of a motor vehicle. According to the invention, the following is provided:
 a) the delivery valve has a first settable maximum volume flow,
 b) the delivery valve has a second settable maximum volume flow which is higher than the first settable maximum volume flow,
 c) a control device (24, 25), by means of which optionally the first or the second maximum volume flow can be set,
 d) a sensor device (20, 21), which is configured for interaction with a signal emitter (29) assigned to the tank of the motor vehicle and which activates the control device.

19 Claims, 12 Drawing Sheets

(56) References Cited

U.S. PATENT DOCUMENTS

| | | | |
|---|---|---|---|
| 9,242,849 B2 | 1/2016 | Kunter et al. | |
| 2011/0277880 A1* | 11/2011 | Meyer | B67D 7/44 |
| | | | 141/217 |
| 2012/0073700 A1* | 3/2012 | Meyer | B67D 7/44 |
| | | | 141/198 |
| 2013/0213364 A1* | 8/2013 | Koukan | B60K 15/03519 |
| | | | 123/518 |
| 2014/0048173 A1* | 2/2014 | Fedde | B67D 7/02 |
| | | | 141/311 A |
| 2015/0210529 A1* | 7/2015 | Schulze | B67D 7/344 |
| | | | 141/349 |

FOREIGN PATENT DOCUMENTS

| | | |
|---|---|---|
| EP | 1880975 | 1/2008 |
| EP | 2386520 | 11/2011 |
| EP | 2186773 | 5/2013 |
| EP | 2733113 | 5/2014 |

* cited by examiner

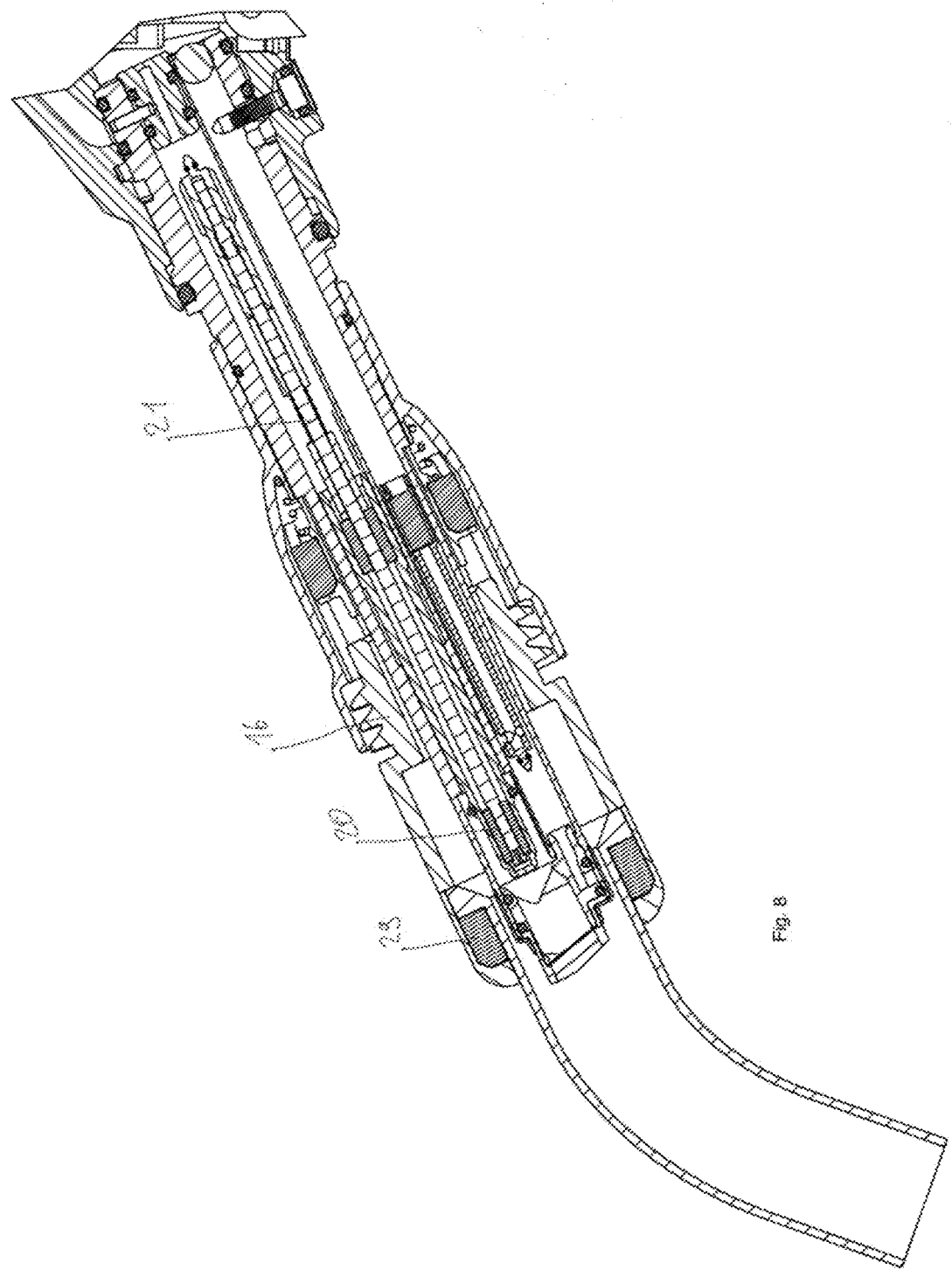

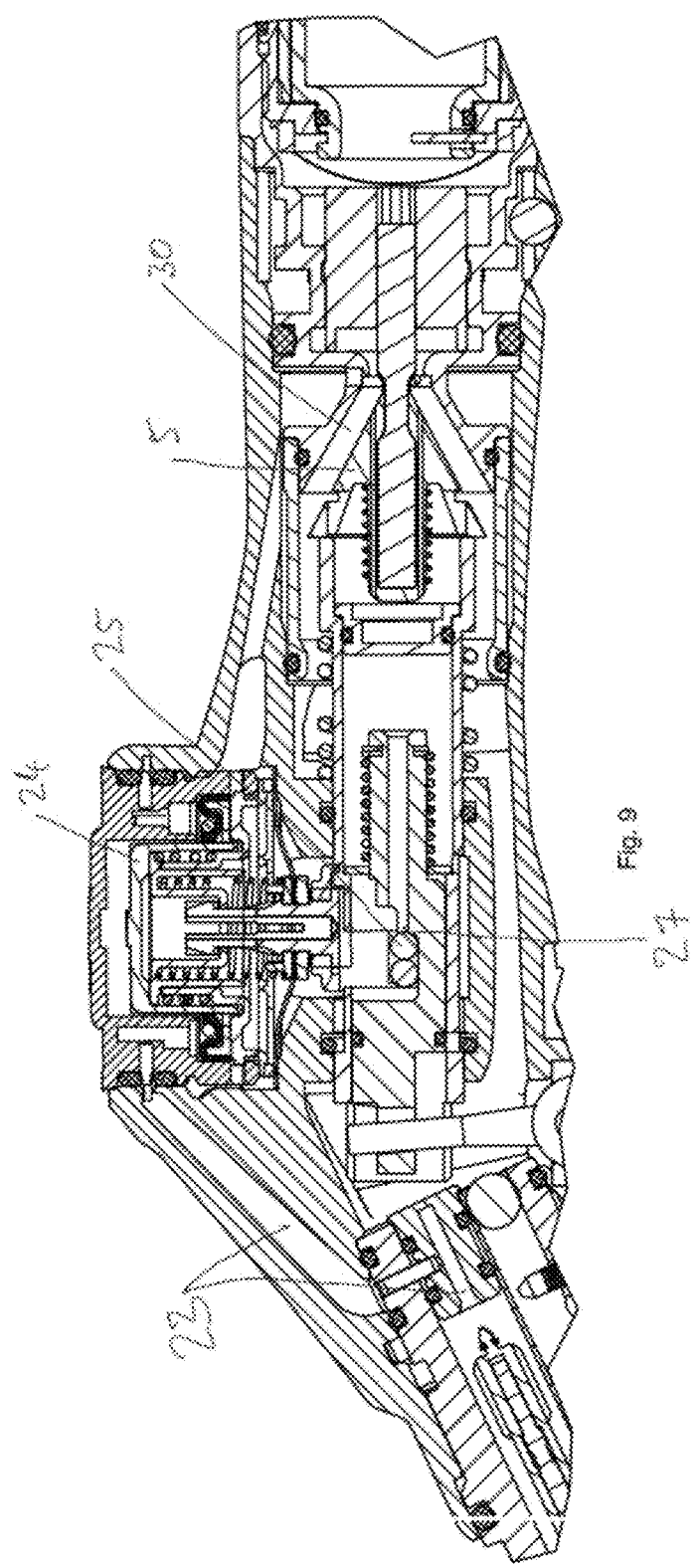

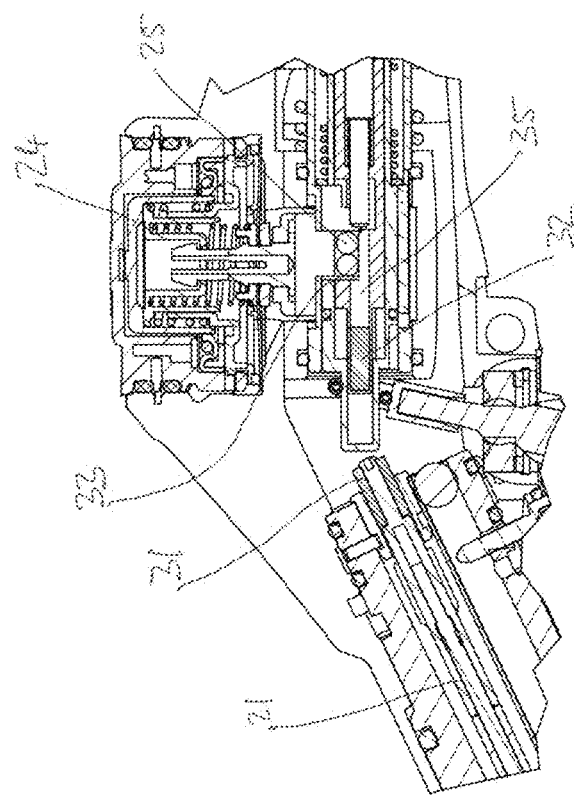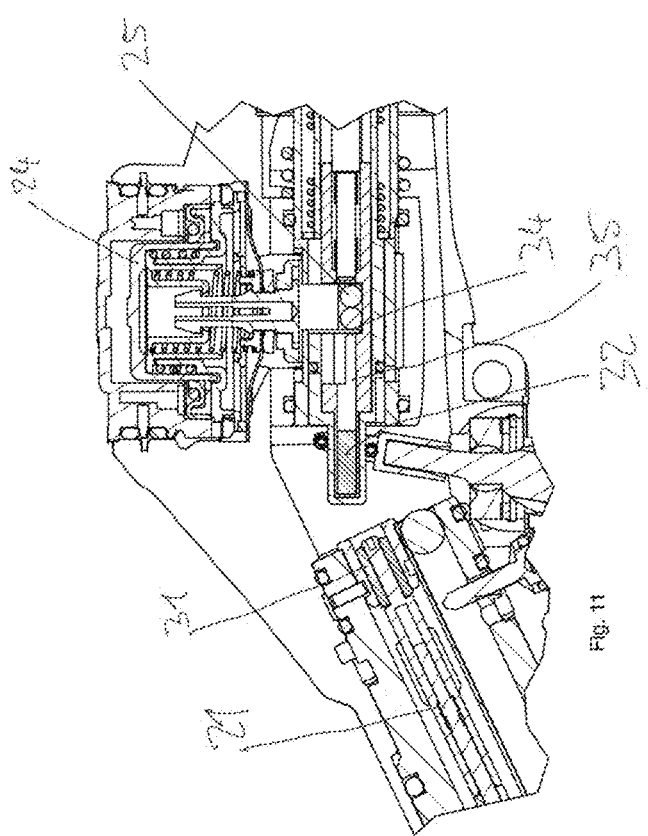

SIGNAL-CONTROLLED FLOW FUEL DELIVERY VALVE

The invention concerns a delivery valve for the delivery of a fluid into a tank of a motor vehicle.

Delivery valves for fuelling motor vehicles are known for example from EP 2 186 773 A1. Delivery valves with misfuelling protection are also known, which are intended to ensure that fluid is delivered only after insertion in a tank specifically provided for this fluid. In simple cases, such a misfuelling protection may consist merely of different diameters of the outlet pipe of the delivery valve and the filler neck of the associated tank, as known for example in delivery valves for petrol and diesel fuel.

In view of the ever more stringent emission standards, diesel motor vehicles require auxiliary fluids which structure the combustion so as to produce little pollution and reduce exhaust emissions. In particular, it is known here to use a 32.5% urea solution (known under the trade name AdBlue) which serves to reduce nitrogen oxide emissions from diesel engines.

The use of urea solution as an auxiliary fluid is already very common in the heavy goods vehicle sector, and becoming increasingly important in diesel cars. EP 2 733 113 A1 discloses a delivery valve suitable for the delivery of AdBlue.

The invention is based on the object of creating a delivery valve of the type cited initially which can be used universally.

The invention achieves this object with a delivery valve with the following features:
a) the delivery valve has a first settable maximum volume flow,
b) the delivery valve has a second settable maximum volume flow which is higher than the first settable maximum volume flow,
c) a control device, by means of which optionally the first or the second maximum volume flow can be set,
d) a sensor device, which is configured for interaction with a signal emitter assigned to the tank of the motor vehicle and which activates the control device.

A delivery valve is a device for controlling the fluid flow during the filling process. The requirements for the construction and function of automatic delivery valves for use in fuel delivery pumps are regulated in DIN EN 13012. The terms defined there are also used in the present application.

The feature "for delivery of a fluid into a tank of a motor vehicle" expresses the suitability of the delivery valve for such a filling process.

The user controls the delivery of fluid by means of a main valve. To actuate the main valve, normally an actuation lever is used (also called a switch lever). The fluid is conducted through an outlet pipe into the container to be filled.

The delivery valve has a first and a second settable maximum volume flow. This means that the user can control the volume flow by means of the switch lever only up to the respectively set first or second maximum volume flow. The respectively set maximum volume flow thus limits the maximum fluid delivery per time unit. The second maximum volume flow is higher than the first maximum volume flow. The invention is not restricted to a delivery valve with precisely two settable maximum volume flows, but also comprises embodiments in which the delivery valve has three or more settable maximum volume flows.

By means of a control device, optionally the first or the second (or also further) maximum volume flow can be set. This control device cannot be influenced by the user during normal actuation of the delivery valve, and thus limits the volume flow which the delivery valve can deliver on actuation (usually of the switch lever) as far as the stop.

The control device is activated by a sensor device which is configured for interaction with a signal emitter assigned to the tank of the motor vehicle. Depending on the configuration of this tank and the associated filler neck, thus the first or the higher second maximum volume flow (in some cases also further, even higher volume flows) of the delivery valve can be set via the signal emitter of the tank, the sensor device and the control device.

The delivery valve according to the invention has particular advantages for filling diesel cars with AdBlue.

Trucks have relatively large-capacity tanks for AdBlue, and an associated filler neck according to ISO 22241-4. This filler neck is provided with a ring magnet which cooperates with a sensor of the associated truck AdBlue delivery valve, and hence offers misfuelling protection. Truck delivery valves usually allow a relatively high maximum volume flow of AdBlue of around 20 to 40 l/min.

Diesel cars usually have significantly smaller AdBlue tanks, typically with a volume of around 10 to 15 l. An associated filler neck to ISO 22241-5 does not comprise the ring magnet described above, and is configured for a significantly smaller volume flow of typically a maximum 10 l/min, usually around 5 l/min. The cross-section and purging of the filler neck do not allow higher volume flows. These car tanks are accordingly not designed for filling using truck AdBlue delivery valves.

Following the introduction of the Euro 6c emission standards, the requirements for nitrogen oxide emissions of diesel cars in actual driving operation have become more stringent, requiring higher AdBlue quantities in the SCR catalyst of up to around 0.6 l per 100 km. In order to guarantee adequate driving intervals between the filling processes, this requires larger tank volumes in cars, for example around 30 l. Filling such tanks using a conventional car AdBlue delivery valve (volume flow around 5 l/min) is time-consuming. The AdBlue tanks of such cars are often therefore provided with a filler neck which allows higher volume flows. Such a filler neck then comprises a ring magnet.

The present invention allows filling of the AdBlue tanks of all cars with a corresponding delivery valve. If the tank has a small volume and a filler neck to ISO 22241-5 without ring magnet, the delivery valve according to the invention sets only the lower first settable maximum volume flow. On filling, activation of the switch lever up to the stop releases only a volume flow which does not overwhelm the filler neck and purging system.

If the car has a larger AdBlue tank with a filler neck designed accordingly to ISO 22241-5 with ring magnet, the second higher maximum volume flow can be released by means of the ring magnet as a signal emitter, the sensor device and the control device.

According to the invention, the first settable maximum volume flow is 2 to 10 l/min, preferably 3 to 8 l/min, further preferably 4 to 6 l/min. These volume flows are suitable for filler necks to ISO 22241-5 without ring magnet.

The second settable maximum volume flow is 12 to 30 l/min, preferably 15 to 25 l/min, further preferably 18 to 22 l/min. These volume flows are suitable for filler necks to ISO 22241-5 with ring magnet, which allow faster filling of even large AdBlue tanks.

According to the invention, it is preferred that the first settable maximum volume flow is set as standard, and the second settable maximum volume flow is set only when the sensor device detects a corresponding signal emitter assigned to the tank of the motor vehicle. Higher volume flows are released only if the sensor device detects, via an associated signal emitter, that this tank is suitable for filling with correspondingly larger volume flows.

For the operation of sensor and/or control devices, a separate energy supply or energy source (preferably electrical energy) may be provided. In a preferred embodiment of the invention, the control device and/or the sensor device—and preferably both—require no external energy.

External energy means any form of energy which is supplied specifically for operation of the delivery valve or taken from an energy source arranged in the delivery valve. The term "external energy" in particular comprises electrical energy, i.e. the delivery valve according to the invention works without electrical energy, and hence requires no external electrical energy supply or internal electrical energy supply, for example a battery.

The embodiment according to the invention without external energy, in particular electrical energy, allows use of the delivery valve according to the invention in the immediate vicinity of further delivery valves which deliver fuel and which must therefore meet particular requirements for explosion protection. For example, the invention allows a delivery valve for the delivery of urea solution to be arranged in the immediate vicinity of diesel or also petrol delivery valves, for example on the same fuel delivery pump.

According to the invention, the signal emitter and the sensor device may preferably be magnets, but the invention is not restricted to this. Preferably, the sensor device is configured for detecting a magnetic emitter assigned to the tank of the motor vehicle. Further preferably, it is configured for detecting a ring magnet of a filler neck according to ISO 22241-5 with ring magnet.

In a preferred embodiment of the invention, the sensor device has a magnet which is arranged displaceably in the region of the outlet pipe of the delivery valve and which is connected to a mechanical signal transmission device for transmission of a control signal to the control device. On insertion in a filler neck with a corresponding magnetic signal emitter, this magnet is displaced and the corresponding signal transmitted via the mechanical device to the control device. To this end, the mechanical signal transmission device may have a signal rod which is kinematically coupled to the displaceably arranged magnet and which is displaceable in the axial direction of the outlet pipe of the delivery valve. In this way, the signal is transmitted mechanically from the outlet end of the outlet to the control device, which is normally arranged in the region of the main valve of the delivery valve.

According to the invention, it may be provided that in the region facing away from the displaceably arranged magnet, the signal rod is configured for closing or opening a pressure channel. As will be described below in the context of the exemplary embodiments, the control device can thus set the first or second maximum volume flow using the operating pressure downstream of the main valve, preferably by means of an automatic shut-off device of the delivery valve which will also be described below.

In an alternative embodiment of the invention, it may be provided that in the region facing away from the displaceably arranged magnet, the signal rod has a first control magnet which is configured for interaction with a second control magnet of the control device. Since the outlet pipe is usually angled relative to the inlet and main body of the delivery valve, in a simple and effective fashion it is possible to transmit a signal via this angled region, as will also be explained below in the context of the exemplary embodiment.

According to the invention, it is thus preferred that the active connection between the sensor device and the control device takes place by pressure, mechanically and/or magnetically.

According to the invention, the control device may be configured to set a first and a second maximum opening lift of a main valve of the delivery valve. The maximum opening lift of the main valve achievable by complete activation of the switch lever is thus limited by the control device.

The object of the invention is thus also a delivery valve according to the invention which is configured to deliver urea solution.

A further object of the invention is a delivery pump for combined delivery of fuels and urea solution, which comprises at least one delivery valve for the delivery of fuel (in particular diesel fuel). According to the invention, it furthermore comprises at least one delivery valve according to the invention for delivery of urea solution. Such a delivery pump allows convenient, simultaneous or directly successive filling with fuel, in particular diesel fuel, and urea solution. There is no need to manoeuvre the motor vehicle in between. This embodiment of the delivery valve according to the invention for delivery of urea solution without a supply of external energy, in particular electrical energy, allows its use in the immediate vicinity of a delivery pump for delivery of fuels.

Exemplary embodiments of the invention are described below with reference to the drawing. This shows:

FIG. 1 an embodiment of a delivery valve according to the invention in a sectional drawing;

FIG. 2 in an extract from FIG. 1, the outlet end of the outlet pipe;

FIG. 3 in an extract from FIG. 1, the region of the main valve;

FIG. 4 the delivery valve in operating state in a filler neck according to ISO 22241-5 without ring magnet;

FIG. 5 in an extract from FIG. 4, the outlet end of the outlet pipe;

FIG. 6 in an extract from FIG. 4, the region of the main valve;

FIG. 7 the delivery valve in operating state in a filler neck according to ISO 22241-5 with ring magnet;

FIG. 8 in an extract from FIG. 7, the outlet end of the outlet pipe;

FIG. 9 in an extract from FIG. 7, the region of the main valve;

FIG. 10 a second embodiment of the invention with a different signal transmission route, with the first maximum volume flow set;

FIG. 11 the second embodiment of the invention with the second maximum volume flow set;

FIG. 12 diagrammatically, filler necks with interfaces according to ISO 22241-5 with and without ring magnet;

FIG. 13 diagrammatically, in a flow diagram, the function of a delivery valve according to the invention.

A delivery valve according to the invention (also known as a filler nozzle) has a valve housing 1, an inlet 2 connected to a hose (not shown) for fluid, an outlet pipe 3 and a switch lever 4. In the known fashion and as described for example in EP 2 386 520 A1, the switch lever 4 actuates a main valve 5 of the delivery valve. A sensor line 6 communicates pneumatically with the environment of the outlet end of the outlet pipe 3, and thus in the conventional manner and as described in the above-mentioned EP specification, causes shut-off when the tank is full.

In the region of the outlet end of the outlet pipe 3, a safety valve 7 is provided which closes against a valve seat downstream. The end of the valve stem 9 pointing upstream is provided with a magnet 10.

A sliding sleeve 11 is arranged around the outer periphery of the outlet pipe 3 in the region of the outlet end. The sliding sleeve 11 is preloaded by a compression spring 12 in the blocking position shown in FIG. 1, which it assumes in an axial end position in the direction of the outlet end of the outlet pipe 3. An annular active magnet 13 is arranged on the sliding sleeve 11. The sliding sleeve 11 is displaceable in a cylindrical pocket 14 which surrounds its outer periphery concentrically and also receives the compression spring 12.

In the position shown in FIG. 1 or FIG. 2, the safety valve is preloaded in the closed position by the magnetic interaction between the active magnet 13 and magnet 10.

The sensor line 6 is closed in the direction of the outlet by a sensor line valve 17 which comprises an actuation magnet 19 at the opposite end of the valve stem 18. This valve 17 is also preloaded in the closed position by the magnetic interaction between the active magnet 13 and the actuation magnet 19.

A sensor magnet 20 is arranged close to the outlet end of the outlet pipe and is axially displaceable together with a sensor rod 21. The sensor rod 21 is preloaded in the closed position shown in FIG. 2, in which its upstream end 22 closes a pressure channel 23.

FIG. 3 shows a device with a membrane 24 which serves—in the known fashion and as described for example in EP 2 386 520 A1—for the tank-full shut-off when the outlet end of the outlet pipe is immersed in fluid and hence pressure fluctuations occur in the sensor line 6. This automatic tank-full shut-off device is commonly known to the person skilled in the art and requires no further description here.

The membrane device according to the invention also has the function of a control device. To this end, it is provided that the membrane rollers 25, in a manner to be outlined in more detail below, can assume two different operating positions: in the first operating position, when the switch lever 4 is pulled, they hit against a first stop 26; in the second operating position they hit against a second stop 27, which is moved in the axial direction of the actuating stroke of the main valve 5 relative to the first stop 26, thus causing the main valve 5 to have a larger opening lift on actuation of the switch lever 4 and interaction of the membrane rollers 25 with the second stop 27.

If the actuating lever 4 is pulled in the operating state shown in FIG. 1 with the safety valve 7 closed, firstly the main valve 5 opens and allows fluid to flow into the outlet pipe 3. The pressure there rises since the safety valve 7 does not allow any escape from the outlet pipe 3. As soon as the pressure exceeds a predefined threshold value, a differential pressure is created via the tank-full shut-off device indicated as 15 or its membrane, such that it deploys the tank-full shut-off and decouples the actuating lever 4 from the main valve 5 in the known fashion, so that the main valve 5 closes again under its closing spring. The threshold value for the pressure at which such a deployment takes place lies above the pressure prevailing in the outlet pipe 3 on conventional filling, and below the operating pressure at the inlet 2 of the delivery valve (as provided by the pump of the delivery system).

In FIGS. 4 to 6, the outlet end of the outlet pipe 3 is fully inserted in the filler neck 16 of a urea tank of a car according to ISO 22241-5 without ring magnet. This is structured such that it closely surrounds the outlet pipe even directly in the region of the start of the filler neck, as shown in FIG. 5. The annular end face of the sliding sleeve 11 butts against the corresponding counter-face of the tank filler neck 16, and the sliding sleeve 11 is moved from the blocking position shown in FIGS. 1 and 2 into the open position shown in FIG. 5, against the pressure of the spring 12. In this position, the upstream end of the sliding sleeve 11 butts against a stop. This sliding sleeve 11 also moves the active magnet 13 axially accordingly. The magnetic active connection between the active magnet 13 and the magnet 10 on the valve stem 9 moves the safety valve 7 into the open position shown in FIG. 5. This opening movement takes place in the upstream direction. The filling process can now be started at any time by pulling the switch lever 4, causing the opening of the main valve 5. The outflow of fluid through the outlet pipe 3 is such that the safety valve 7 remains in its open position, and the filling process can be performed. Due to the axial displacement of the active magnet 13, the actuating magnet 19 is also moved into the open position, so that the sensor line valve 17 is also opened.

In the operating state depicted, the sensor rod 21 remains in the position in which it closes the pressure channel 23. The membrane device 24 remains in the upper position (FIG. 6). When the switch lever 4 is pulled, the membrane rollers 25 move against the first stop 26 and the main valve 5 opens with a relatively small opening lift; the opening gap 28 in the exemplary embodiment allows a maximum volume flow of approximately 5 l/min. In this way, the membrane device 24, in interaction with the positioning of the membrane rollers 25 as a control device, sets the first (lower) maximum volume flow.

The filling process may be terminated in the usual way by releasing or unlocking the actuating lever 4. If the tank is largely filled, the end of the outlet pipe 3 and hence also the sensor line 6 is immersed in the fluid. The resulting pressure difference pneumatically causes, in the conventional fashion described for example in EP 2 386 520 A1, a shut-off of the main valve and hence terminates the filling process.

The filling process is also terminated if the delivery valve is removed from the tank filler neck 16, and the sliding sleeve 11 is pushed back from the release position of FIG. 3 into the blocking position of FIG. 1 or 2 by means of spring 12. Due to the magnetic interaction between the ring magnet 13 (active magnet 13) and the magnets 10, the safety valve 7 is moved back in the downstream direction into its closed position. If the main valve 5 is now still open, the pressure rise in the outlet pipe 3 causes the deployment of the tank-full shut-off device described above and hence a closure of the main valve 5.

Gases escaping during the filling process can be returned by the delivery valve in the usual fashion through a gas extraction channel (not shown).

In FIGS. 7 to 9, the outlet end of the outlet pipe 3 is fully inserted in the filler neck 16 of a urea tank of a car according to ISO 22241-5 with ring magnet. The function is in principle identical to that described above in the context of FIGS. 4 to 6.

The filler neck or tank filler neck has a ring magnet 29, which identifies the tank and filler neck as suitable for a larger volume flow. When the delivery valve is inserted, the ring magnet 29 interacts with the sensor magnet 20 and pulls the sensor rod 21 downstream in the axial direction against its preload. This causes the pressure channel 23 to be opened, as shown in FIGS. 8 and 9.

The pressure prevailing in the outlet pipe (typically around 3.5 bar) is now actively connected via the now open pressure channel 23 to the membrane device 24, and allows this to assume its lower position shown in FIG. 9. In this lower position, the membrane rollers 25 come into interaction with the second stop 27, and when the switch lever 4 is pulled, allow a significantly greater opening lift of the main valve 5 with a correspondingly larger opening gap 30, which allows a maximum volume flow of around 20 l/min. In this way, the membrane device 24, in interaction with the positioning of the membrane rollers 25 as a control device, sets the second (higher) maximum volume flow.

During filling, the pressure in the outlet pipe and hence also in the pressure channel 23 falls below the threshold value, which moves the membrane device 24 into its lower position. During the ongoing filling process, the membrane rollers 25 remain in engagement with the second stop 27 due to friction or clamping effect. After termination of the filling process, the membrane device 24 jumps back to its upper position in which only the first maximum volume flow is possible.

FIGS. 10 and 11 show an alternative embodiment of the invention in which the signal transmission between the sensor rod 21 and the control device takes place magnetically.

At its end pointing away from the outlet, the sensor rod 21 is provided with a first control magnet 31. This cooperates by repulsion with a second control magnet 32 which is arranged displaceably on a displacement element 35. Depending on the displacement position of this displacement element 35, the membrane device 24 with membrane rollers 25 assumes either the upper position shown in FIG. 10 (here designated 33) or the lower position shown in FIG. 11 (here designated 34).

In the position of the displacement element 35 shown in FIG. 11, the membrane rollers 25 are in the position which allows the larger opening lift of the main valve 5 (second maximum volume flow).

In the position of the displacement device 35 shown in FIG. 10, the membrane rollers 25 with the membrane device 24 are raised from the displacement element 35 into the position which allows only the smaller opening lift of the main valve 5 (first maximum volume flow).

Normally, the sensor rod 21 assumes the position shown in FIG. 10, so that the delivery valve sets only the first maximum volume flow.

Only when, on insertion of the delivery valve in a filler neck 16 of a urea tank of a car according to ISO 22241-5 with ring magnet, this ring magnet 29 interacts with the sensor magnet 20 and pulls the sensor rod 21 downstream in the axial direction against its preload, do the sensor rod 21 and first control magnet 31 assume the position shown in FIG. 11. The second control magnet 32 with the displacement element 35 moves into the position shown in FIG. 11 due to the absent or reduced magnetic repulsion, so that now the greater second maximum volume flow is released.

Figure 1:
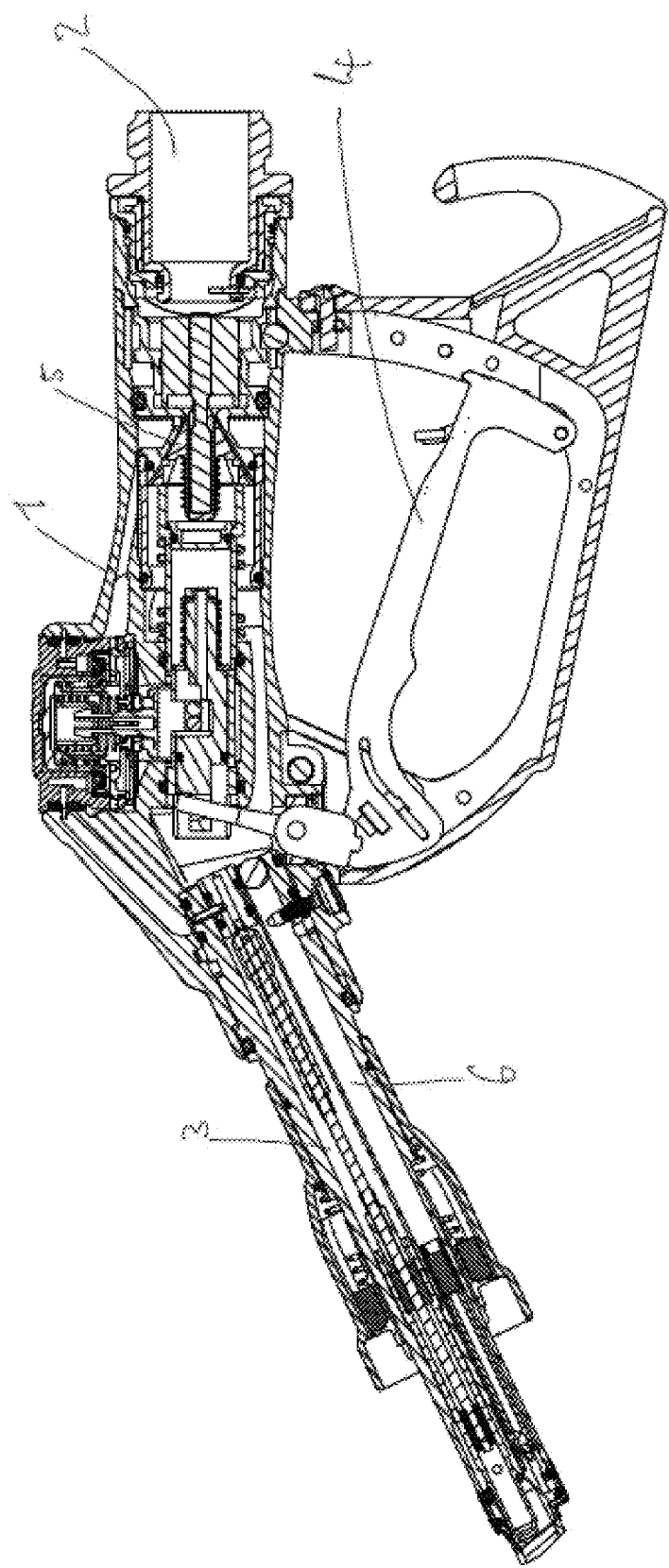
Figure 2:
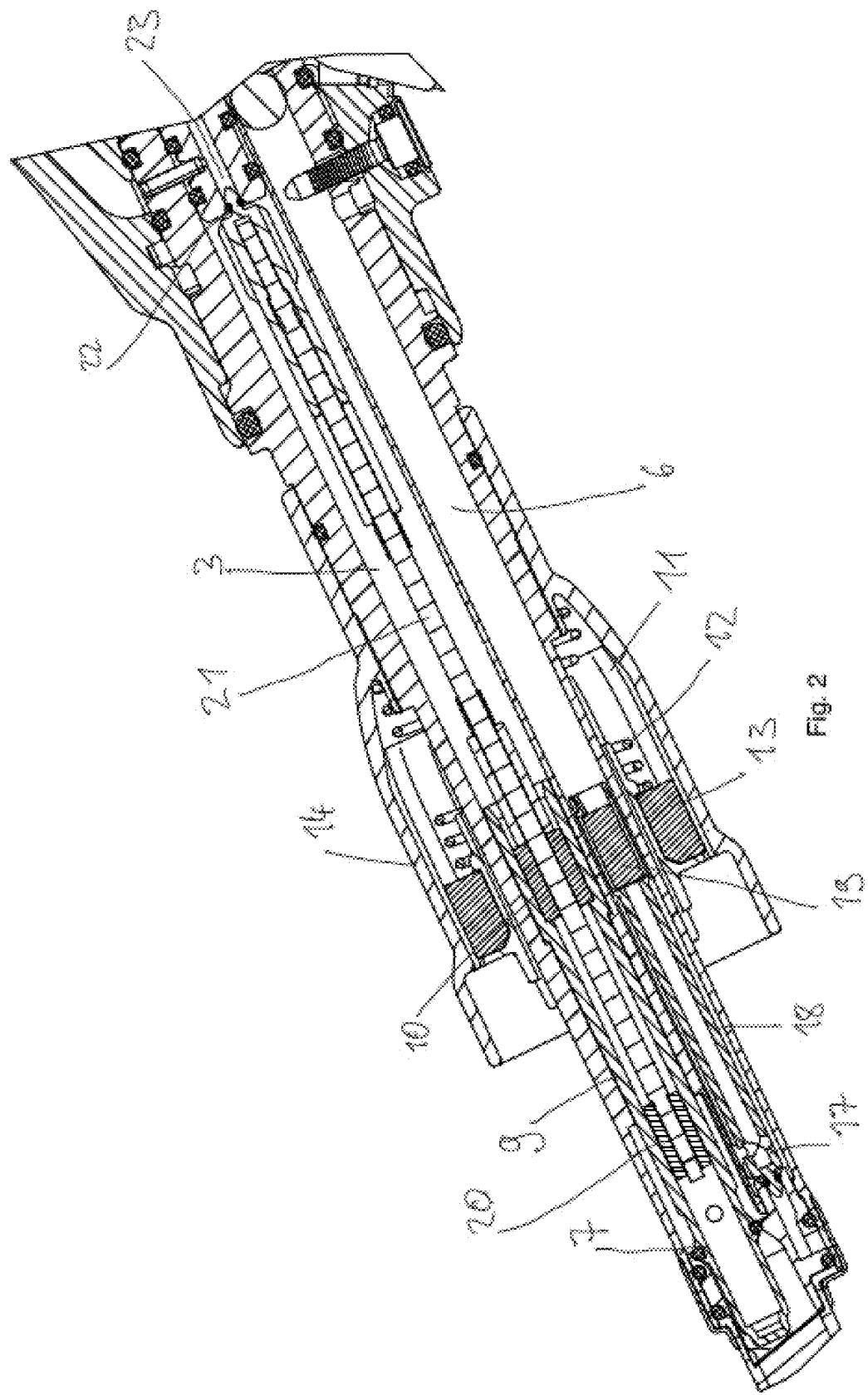
Figure 3:
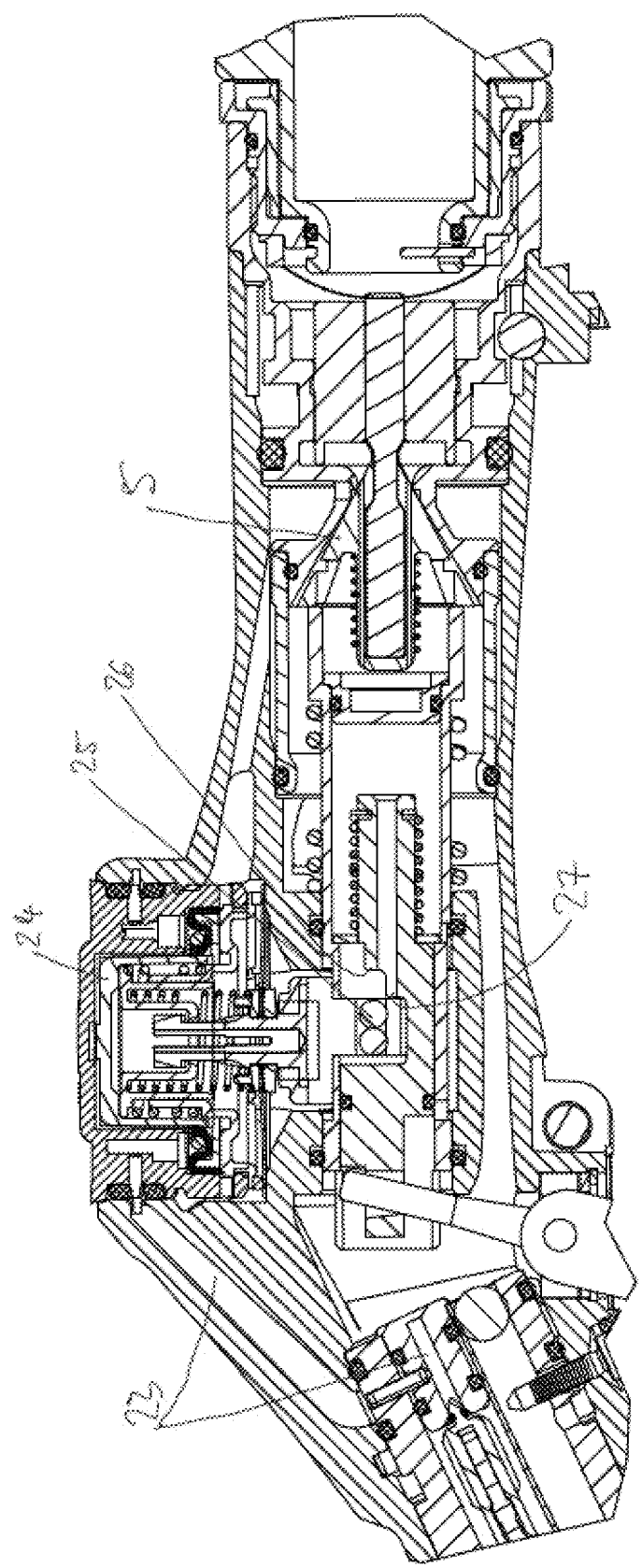
Figure 4:
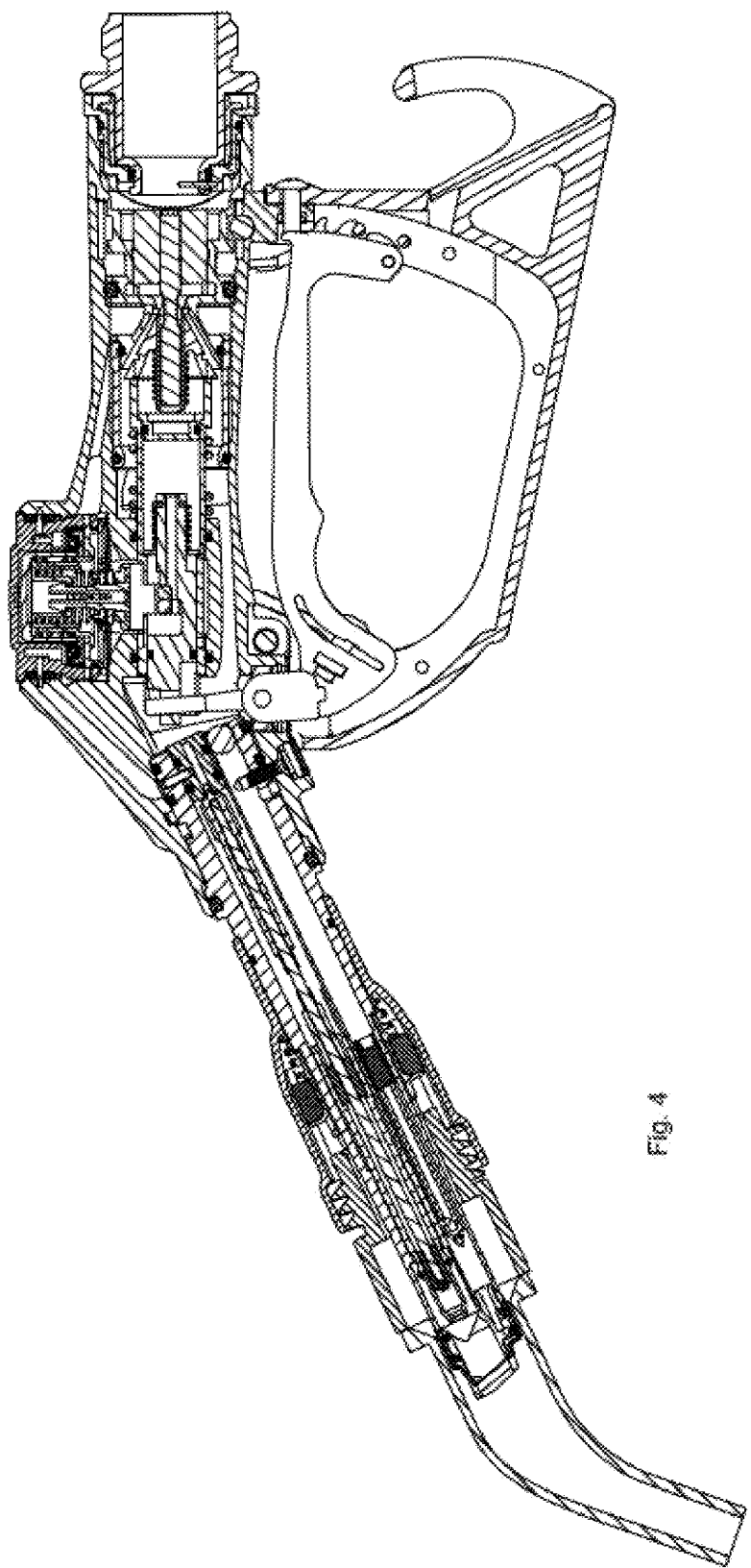
Figure 5:
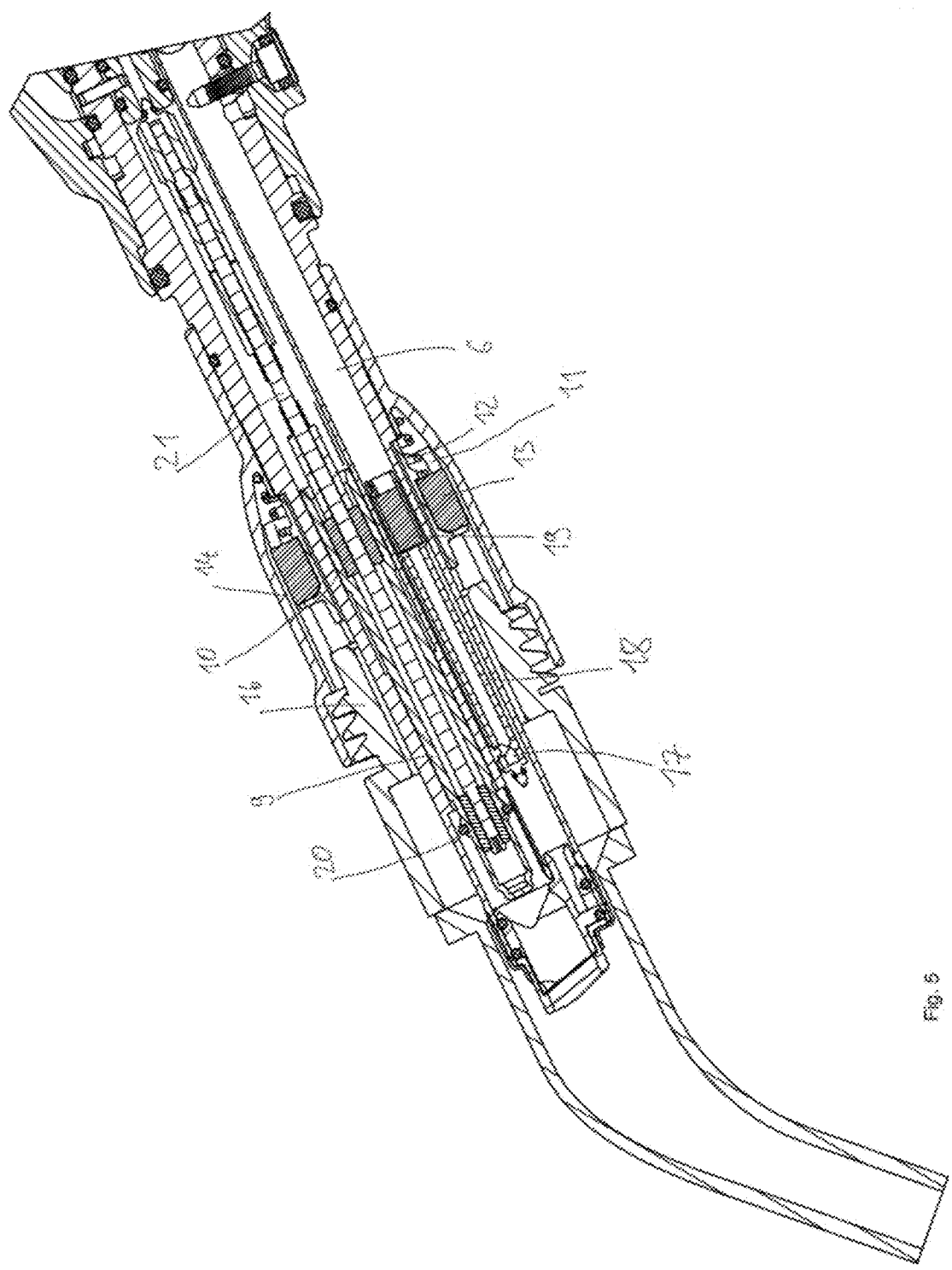
Figure 6:
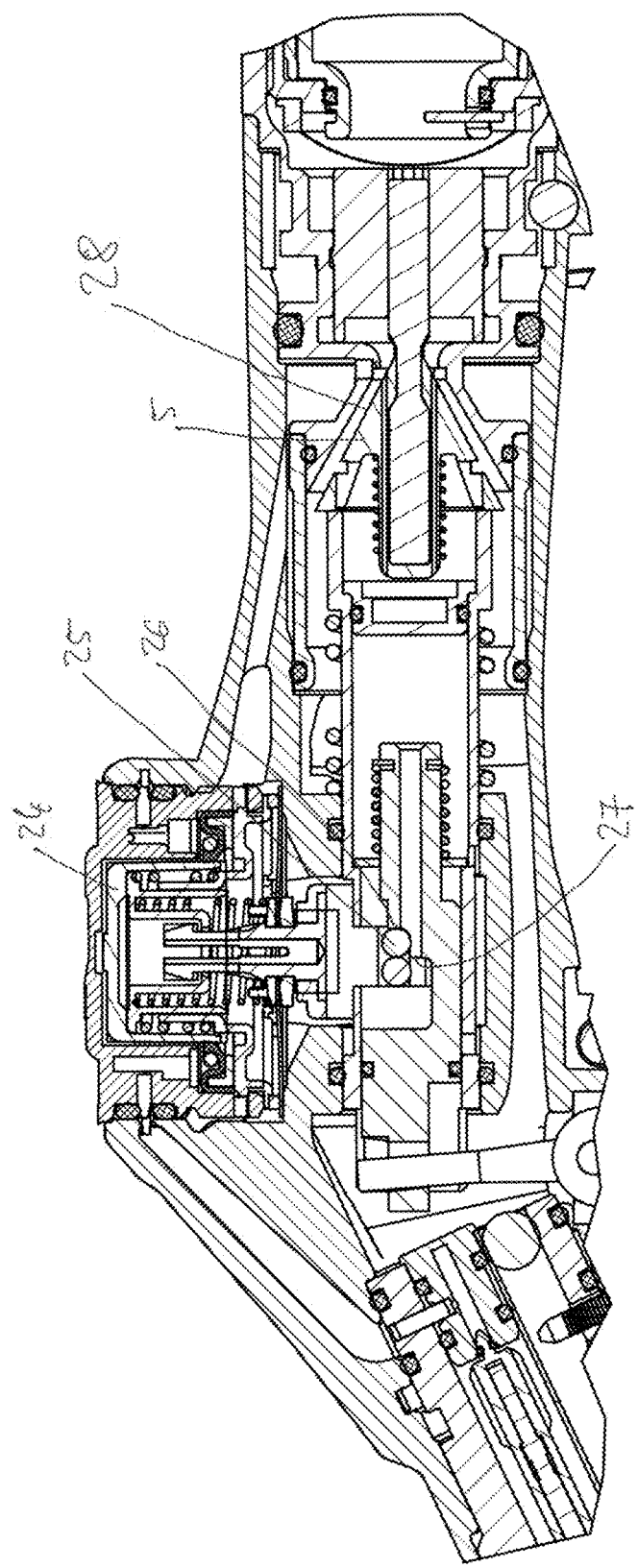
Figure 7:
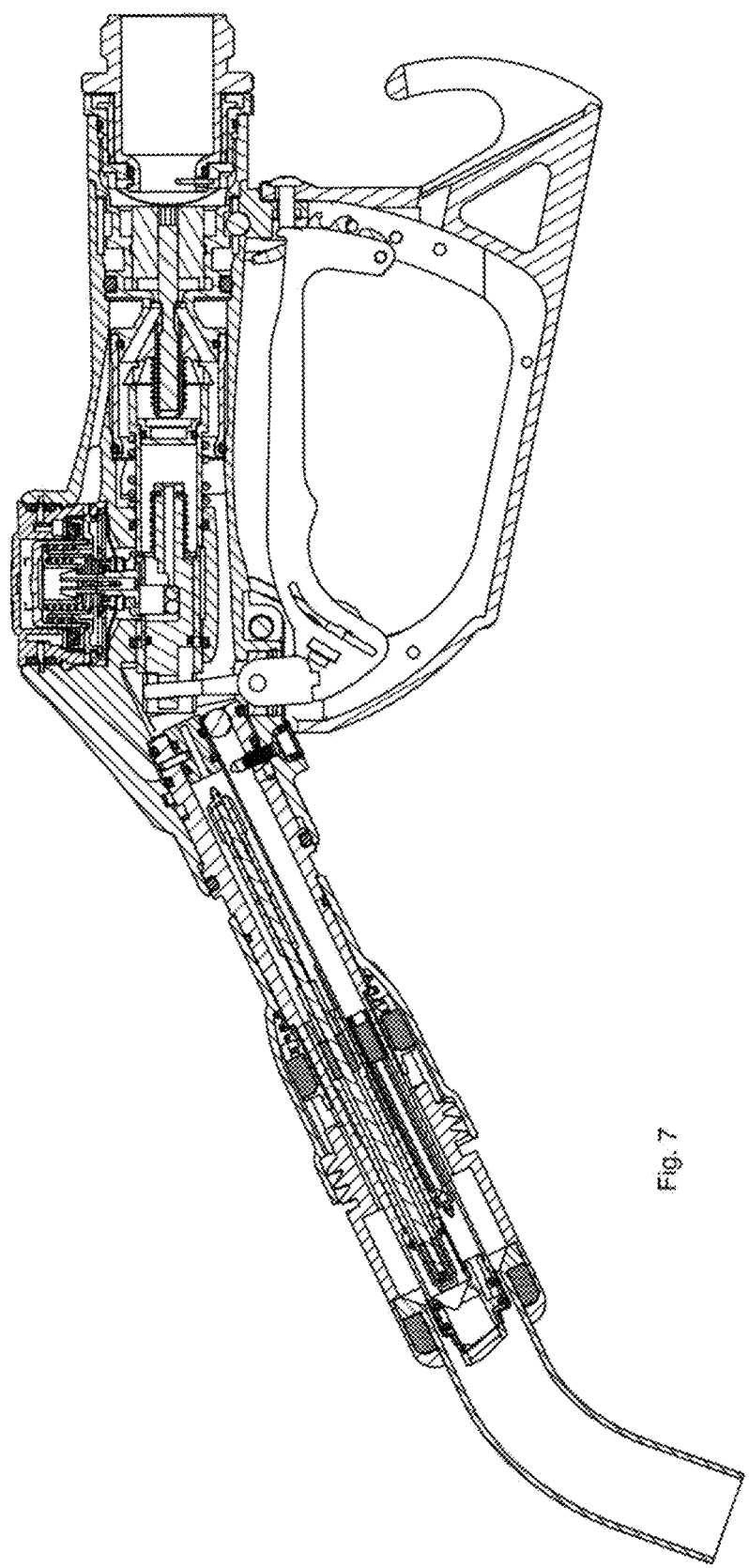
Figure 12:
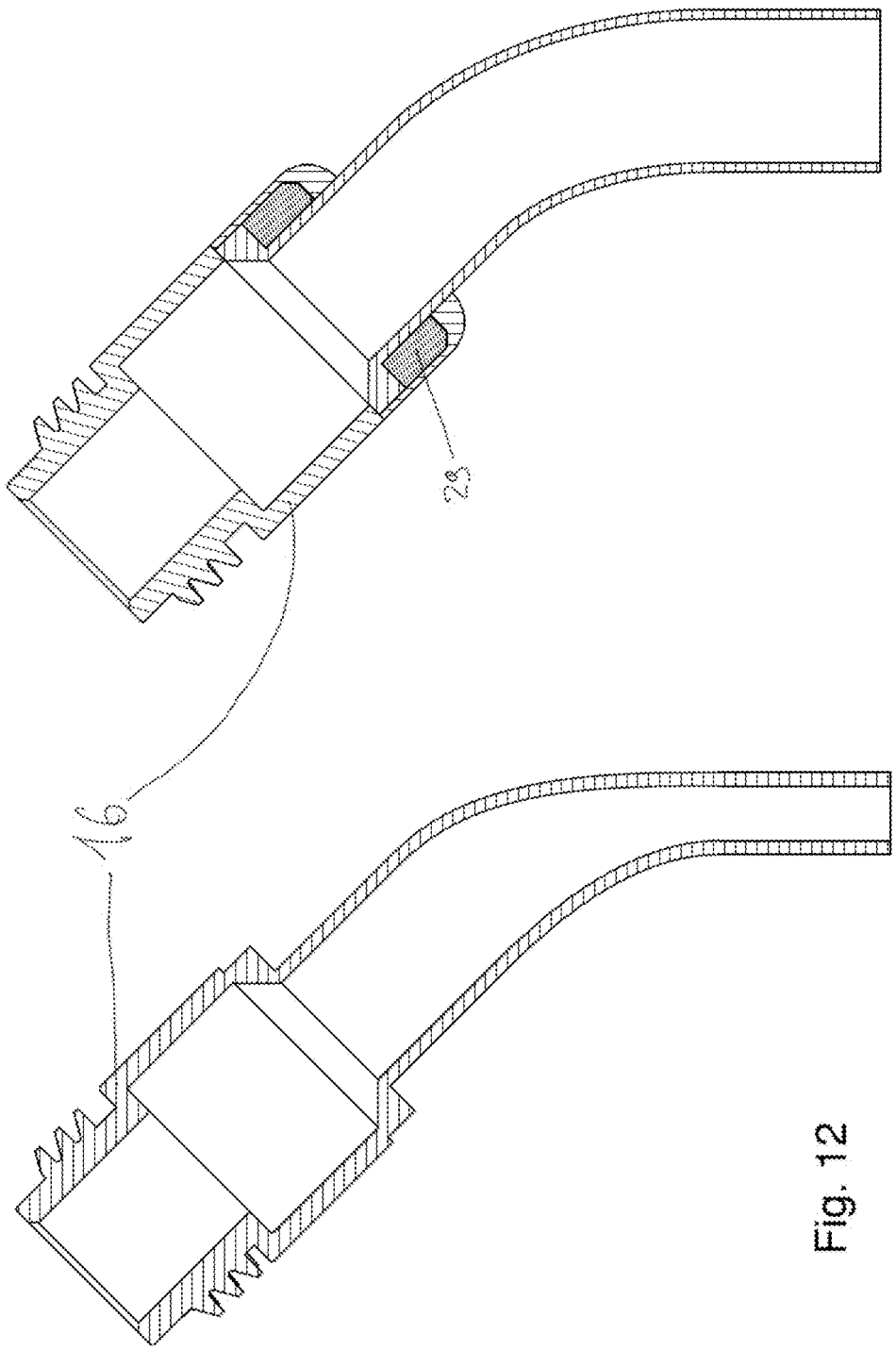
FIG. 12 shows diagrammatically filler necks with interfaces according to ISO 22241-5 with and without ring magnet 29.
Figure 13:
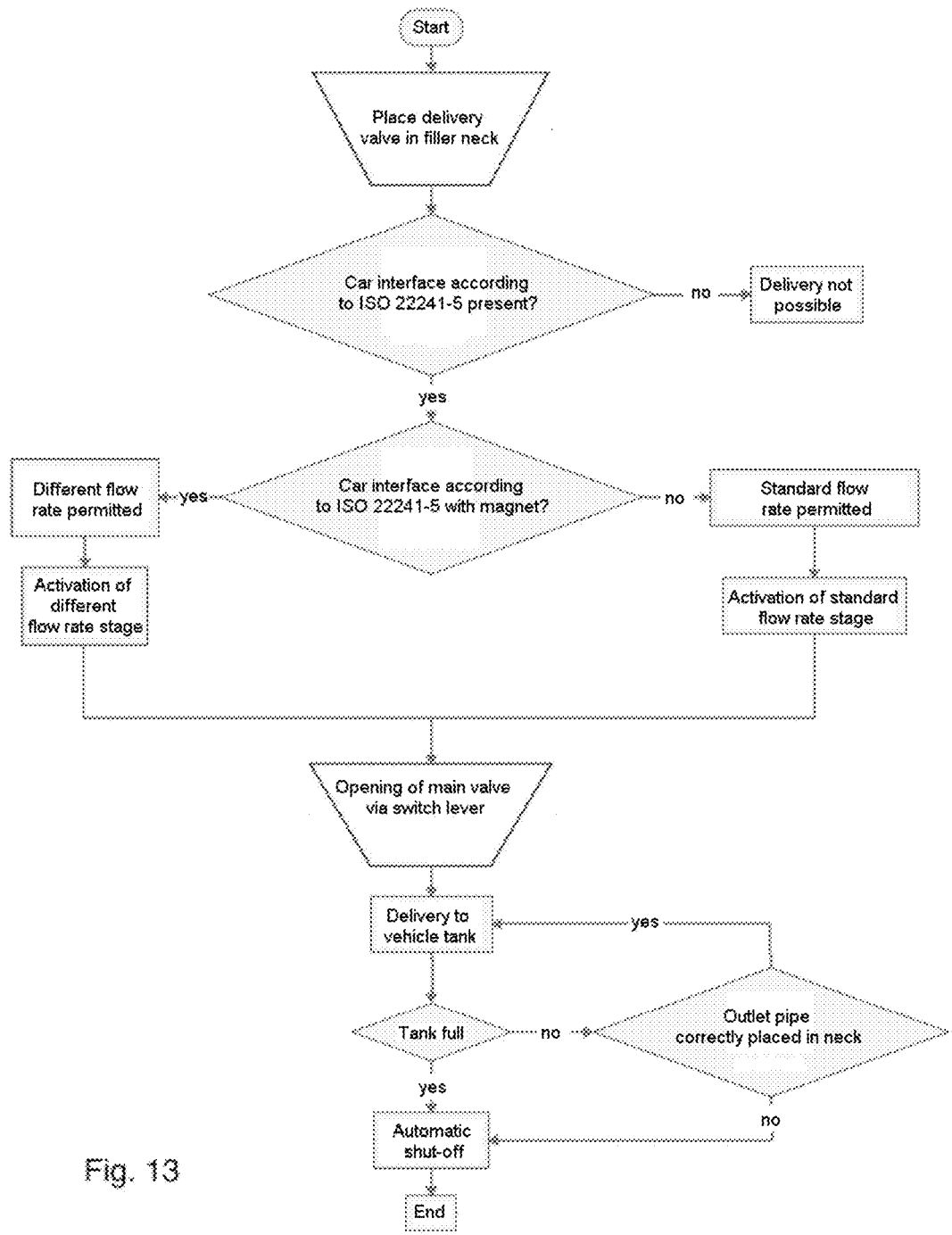
FIG. 13 shows diagrammatically in a flow diagram the function of a delivery valve according to the invention.

Delivery of AdBlue is possible only when the valve is introduced into a filler neck according to ISO 22241-5, since otherwise the safety valve 7 remains closed.

If such a filler neck is detected, the standard flow rate (first settable maximum volume flow, in the exemplary embodiment 5 l/min) is set as standard.

If in addition a ring magnet 29 is detected, in the manner described the different flow rate (second settable maximum volume flow, in the exemplary embodiment 20 l/min) is set.

The invention claimed is:

1. Delivery valve for the delivery of a fluid into tanks of different motor vehicles, characterized by the following features:
   a) the delivery valve has a first settable maximum volume flow which is larger than zero,
   b) the delivery valve has a second settable maximum volume flow which is higher than the first settable maximum volume flow,
   c) a control device (24, 25), by means of which the first or the second maximum volume flow can be set,
   d) a sensor device (20, 21), which is configured for interaction with a signal emitter (29) assigned to a tank of a motor vehicle and which activates the control device to set the delivery valve to the first settable maximum volume flow or the second maximum volume flow based on a signal received from the signal emitter (29).

2. Delivery valve according to claim 1, characterized in that the first settable maximum volume flow is 2 to 10 l/min.

3. Delivery valve according to claim 1, characterized in that the second settable maximum volume flow is 12 to 30 l/min.

4. Delivery valve according to claim 1, characterized in that the first settable maximum volume flow is set as standard, and the second settable maximum volume flow is set only when the sensor device (20, 21) detects a corresponding signal emitter (29) assigned to the tank of the motor vehicle.

5. Delivery valve according to claim 1, characterized in that the control device (24, 25) and/or the sensor device (20, 21) require no external energy.

6. Delivery valve according to claim 1, characterized in that the sensor device (20, 21) is configured for detecting a magnetic emitter (29) assigned to the tank of the motor vehicle.

7. Delivery valve according to claim 6, characterized in that the sensor device (20, 21) is configured for detecting a ring magnet (29) of a filler neck according to ISO 22241-5 with ring magnet.

8. Delivery valve according to claim 6, characterized in that the sensor device (20, 21) has a magnet (20) which is arranged displaceably in the region of the outlet pipe of the delivery valve and which is connected to a mechanical signal transmission device (21) for transmission of a control signal to the control device.

9. Delivery valve according to claim 8, characterized in that the mechanical signal transmission device has a signal rod (21) which is kinematically coupled to the displaceably arranged magnet (20) and which is displaceable in the axial direction of the outlet pipe of the delivery valve.

10. Delivery valve according to claim 9, characterized in that in the region facing away from the displaceably arranged magnet (20), the signal rod (21) is configured for closing or opening a pressure channel (23).

11. Delivery valve according to claim 9, characterized in that in the region facing away from the displaceably arranged magnet (20), the signal rod (21) has a first control magnet (31) which is configured for interaction with a second control magnet (32) of the control device.

12. Delivery valve according to claim 1, characterized in that the active connection between the sensor device and the control device takes place by pressure, mechanically and/or magnetically.

13. Delivery valve according to claim 1, characterized in that the control device (24, 25) is configured to set a first and a second maximum opening lift of a main valve of the delivery valve.

14. Delivery valve according to claim 1, characterized in that it is configured to deliver urea solution.

15. Delivery pump for combined delivery of fuels and urea solution, with at least one delivery valve for delivery of fuel, characterized in that the delivery pump comprises at least one delivery valve according to claim 14 for delivery of urea solution.

16. Delivery valve according to claim 1, characterized in that the first settable maximum volume flow is 3 to 8 l/min.

17. Delivery valve according to claim 1, characterized in that the first settable maximum volume flow is 4 to 6 l/min.

18. Delivery valve according to claim 1, characterized in that the second settable maximum volume flow is 15 to 25 l/min.

19. Delivery valve according to claim 1, characterized in that the second settable maximum volume flow is 18 to 22 l/min.

* * * * *